US012701600B2

(12) United States Patent (10) Patent No.: US 12,701,600 B2

Krasniqi (45) Date of Patent: Aug. 4, 2026

(54) ADJUSTABLE MODULATION AND CODING SCHEME FOR USE DURING UPLINK CONFIGURED GRANTS IN 5G SYSTEMS

(71) Applicant: T-MOBILE INNOVATIONS LLC, Overland Park, KS (US)

(72) Inventor: Gezim Krasniqi, Issaquah, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 655 days.

(21) Appl. No.: 17/960,376

(22) Filed: Oct. 5, 2022

(65) Prior Publication Data

US 2024/0121811 A1     Apr. 11, 2024

(51) Int. Cl.
*H04W 72/542* (2023.01)
*H04W 72/21* (2023.01)
(52) U.S. Cl.
CPC ......... *H04W 72/542* (2023.01); *H04W 72/21* (2023.01)
(58) Field of Classification Search
CPC ............................ H04W 72/542; H04W 72/21
USPC ......................................................... 370/329
See application file for complete search history.

(56) References Cited

U.S. PATENT DOCUMENTS

| | | | | |
|---|---|---|---|---|
| 2008/0037464 A1* | 2/2008 | Lim | ..................... | H04W 72/542 |
| | | | | 370/329 |
| 2008/0268785 A1* | 10/2008 | McCoy | ................. | H04L 1/0026 |
| | | | | 455/67.11 |
| 2017/0164206 A1* | 6/2017 | Madan | .................. | H04W 28/04 |
| 2019/0363810 A1* | 11/2019 | Luo | ...................... | H04B 17/345 |
| 2022/0159589 A1* | 5/2022 | Yu | ......................... | H04W 76/30 |

* cited by examiner

*Primary Examiner* — Chi Tang P Cheng
(74) *Attorney, Agent, or Firm* — SHOOK, HARDY & BACON L.L.P.

(57) ABSTRACT

Aspects provided herein provide methods, systems, and a non-transitory computer storage media storing instructions for adaptably assigning a modulation and coding scheme (MCS). The method begins with receiving an uplink message from at least one user equipment (UE) device. The method also includes receiving a first channel condition report from the at least one UE. A first level of interference for the at least one UE is then determined. The method further provides for determining an uplink radio condition for the at least one UE, based on the channel condition report and the level of interference. Based on the uplink radio condition a first MCS is assigned to the UE.

20 Claims, 5 Drawing Sheets

200

300

| MCS Index | | | Spatial Stream | Modulation | Coding | OFDM (Prior 11ax) | | | | | |
| HT | VHT | HE | | | | 20MHz | | 40MHz | | 80MHz | |
| | | | | | | 0.8μs GI | 0.4μs GI | 0.8μs GI | 0.4μs GI | 0.8μs GI | 0.4μs GI |
|---|---|---|---|---|---|---|---|---|---|---|---|
| 0 | 0 | 0 | 1 | BPSK | 1/2 | 6.5 | 7.2 | 13.5 | 15 | 29.3 | 32.5 |
| 1 | 1 | 1 | 1 | QPSK | 1/2 | 13 | 14.4 | 27 | 30 | 58.5 | 65 |
| 2 | 2 | 2 | 1 | QPSK | 3/4 | 19.5 | 21.7 | 40.5 | 45 | 87.8 | 97.5 |
| 3 | 3 | 3 | 1 | 16-QAM | 1/2 | 26 | 28.9 | 54 | 60 | 117 | 130 |
| 4 | 4 | 4 | 1 | 16-QAM | 3/4 | 39 | 43.3 | 81 | 90 | 175.5 | 195 |
| 5 | 5 | 5 | 1 | 64-QAM | 2/3 | 52 | 57.8 | 108 | 120 | 234 | 260 |
| 6 | 6 | 6 | 1 | 64-QAM | 3/4 | 58.5 | 65 | 121.5 | 135 | 263.3 | 292.5 |
| 7 | 7 | 7 | 1 | 64-QAM | 5/6 | 65 | 72.2 | 135 | 150 | 292.5 | 325 |
| | 8 | 8 | 1 | 256-QAM | 3/4 | 78 | 86.7 | 162 | 180 | 351 | 390 |
| | 9 | 9 | 1 | 256-QAM | 5/6 | N/A | N/A | 180 | 200 | 390 | 433.3 |
| | | 10 | 1 | 1024-QAM | 3/4 | | | | | | |
| | | 11 | 1 | 1024-QAM | 5/6 | | | | | | |

FIG. 3

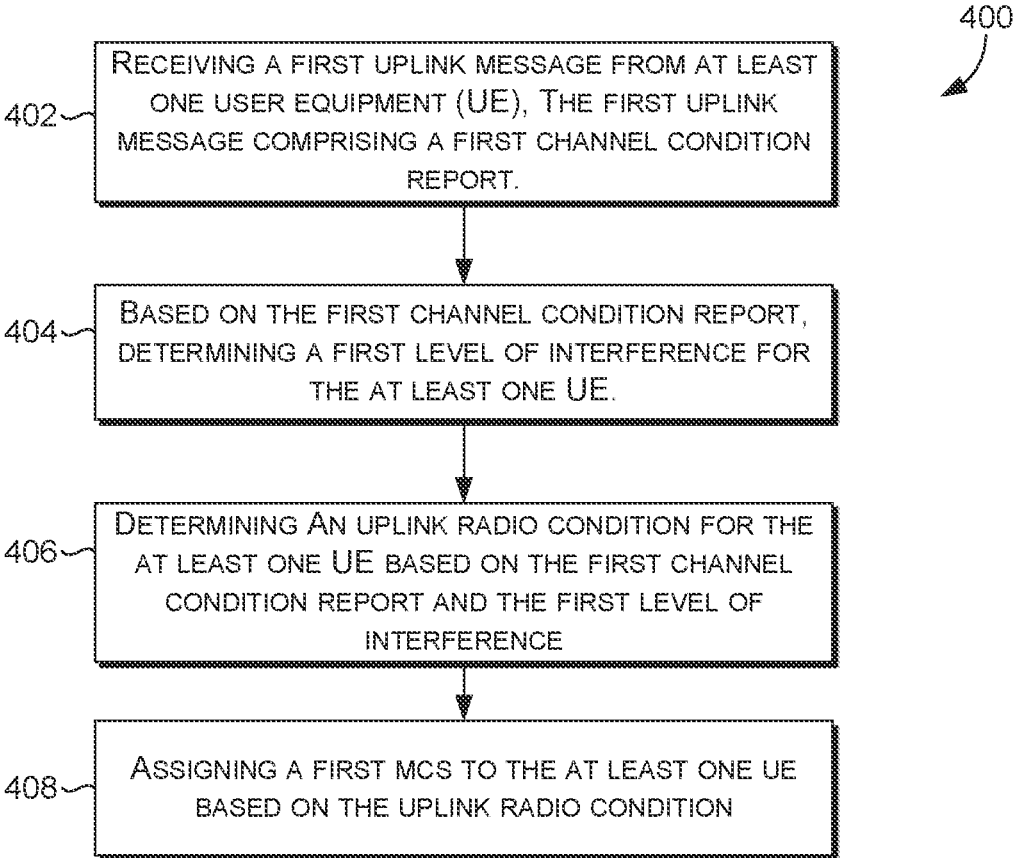

402 — RECEIVING A FIRST UPLINK MESSAGE FROM AT LEAST ONE USER EQUIPMENT (UE), THE FIRST UPLINK MESSAGE COMPRISING A FIRST CHANNEL CONDITION REPORT.

404 — BASED ON THE FIRST CHANNEL CONDITION REPORT, DETERMINING A FIRST LEVEL OF INTERFERENCE FOR THE AT LEAST ONE UE.

406 — DETERMINING AN UPLINK RADIO CONDITION FOR THE AT LEAST ONE UE BASED ON THE FIRST CHANNEL CONDITION REPORT AND THE FIRST LEVEL OF INTERFERENCE

408 — ASSIGNING A FIRST MCS TO THE AT LEAST ONE UE BASED ON THE UPLINK RADIO CONDITION

MEMORY

512

PROCESSOR(S)

514

PRESENTATION
COMPONENT(S)

516

RADIO(S)

524

510

I/O PORT(S)

518

I/O COMPONENTS

520

POWER SUPPLY

522

ADJUSTABLE MODULATION AND CODING SCHEME FOR USE DURING UPLINK CONFIGURED GRANTS IN 5G SYSTEMS

BACKGROUND 5G networks and beyond are designed to support reliable and low latency communications. 5G defines a new radio (NR) interface with a new mechanism at the physical (PHY) layer and the medium access control (MAC) layer to reduce communication latency. To achieve this lower latency, 5G system use a scheduling scheme, known as configured grant scheduling for uplink transmissions that eliminates the need to request and assign resources for each packet transmission by allocating resources in advance to the user equipment (UE). The resource blocks are allocated along with a modulation and coding scheme (MCS). Multiple MCS schemes may be assigned to the UE, however, the MCS zero scheme provides multiple bits for redundancy, which can negatively affect uplink spectral efficiency. Aspects discussed herein provide for adjusting MCS when the uplink configured grants are allocated to the UEs.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems adaptably assigning a modulation and coding scheme (MCS). The method begins with receiving a first uplink message from at least one user equipment (UE), which also includes a first channel condition report. A first level of interference for the at least one UE is then determined based on the first channel condition report. The method further provides for determining an uplink radio condition for the at least one UE, based on the first channel condition report and the first level of interference. Based on the uplink radio condition a first MCS is assigned to the UE.

In a further embodiment, a system for adaptably assigning a modulation and coding scheme (MCS). The system includes a base station with one or more antennas for receiving uplink messages from at least one user equipment (UE) and for transmitting downlink messages to the at least one UE. The system also includes a processor, which is configured to receive a first uplink message from the at least one UE. The uplink message contains a first channel condition report. The system then determines a first level of interference for the at least one UE based on the first channel condition report. An uplink radio condition for the at least one UE may then be determined based on the first channel condition report and the first level of interference. Based on the uplink radio condition a first MCS can then be assigned to the at least one UE based on the uplink radio condition.

An additional embodiment provides a non-transitory computer storage media storing computer-useable instructions that, when executed by one or more processors cause the processors to transmit an uplink message to the base station, the uplink message containing a first channel condition report. The instructions also provide for receipt of a first downlink message from the base station. The first downlink message from the base station contains at least one resource block grant and a first modulation and coding scheme (MCS) based on the first channel condition report and a first level of interference.

BRIEF DESCRIPTION OF THE SEVERAL VIEWS OF THE DRAWINGS

Implementations of the present disclosure are described in detail below with reference to the attached drawing figures, wherein:

FIG. 3 depicts a modulation and coding scheme (MCS) table, in which implementations of the present disclosure may be employed, in accordance with aspects herein;

FIG. 4 is a flow diagram of a method for adjusting a modulation and coding scheme allocation in an uplink configured grant, in which aspects of the present disclosure may be employed, in accordance with aspects herein.

DETAILED DESCRIPTION

Figure 1:
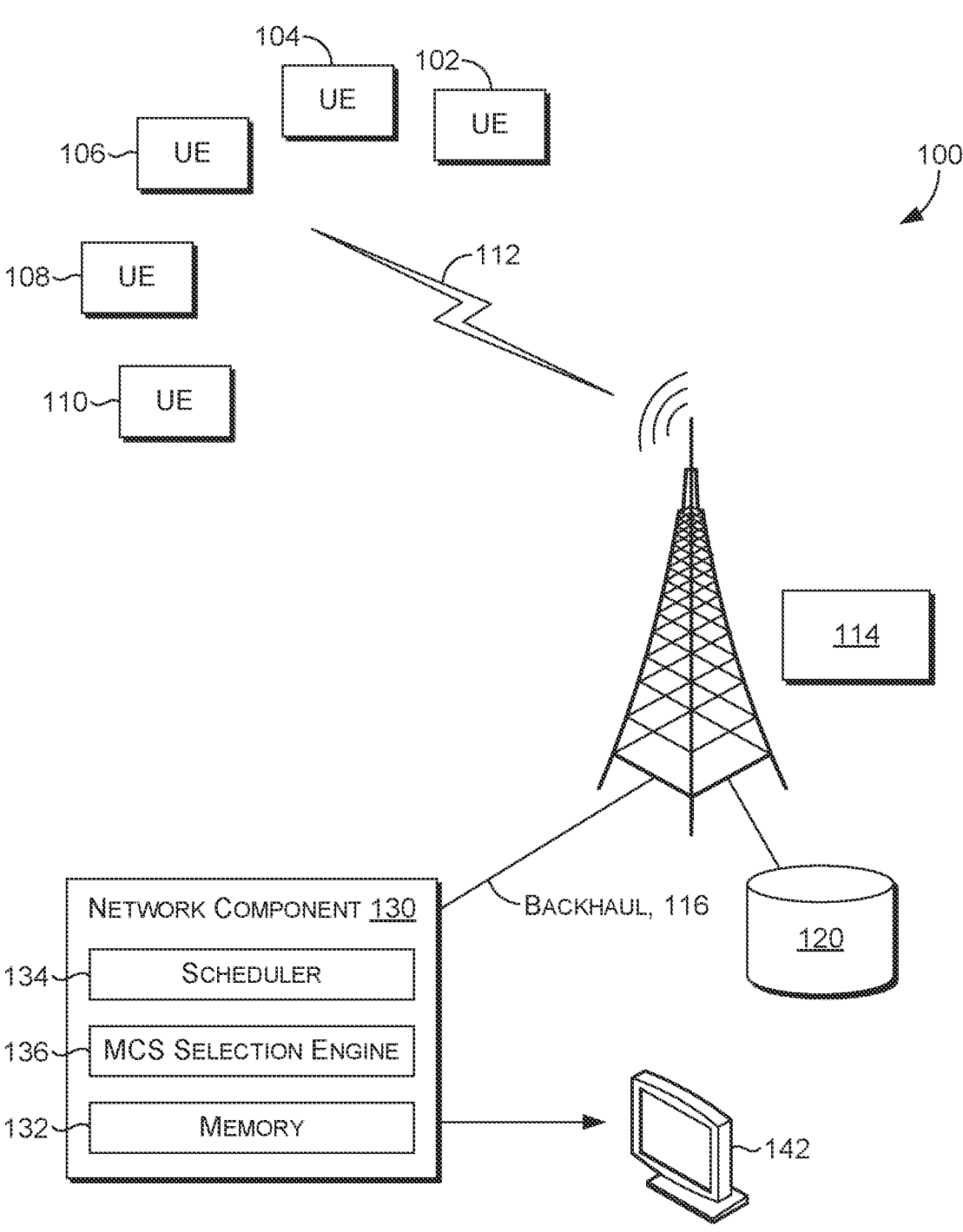
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs EEPROM Electrically Erasable Programmable Read Only Memory LED Light Emitting Diode LTE Long Term Evolution MIMO Multiple Input Multiple Output MD Mobile Device ML Machine Learning PC Personal Computer PCS Personal Communications Service PDA Personal Digital Assistant PDSCH Physical Downlink Shared Channel PHICH Physical Hybrid ARQ Indicator Channel PUCCH Physical Uplink Control Channel PUSCH Physical Uplink Shared Channel RAM Random Access Memory RET Remote Electrical Tilt RF Radio-Frequency RFI Radio-Frequency Interference R/N Relay Node RNR Reverse Noise Rise ROM Read Only Memory RSRP Reference Transmission Receive Power RSRQ Reference Transmission Receive Quality RSSI Received Transmission Strength Indicator SINR Transmission-to-Interference-Plus-Noise Ratio SNR Transmission-to-noise ratio SON Self-Organizing Networks TDMA Time Division Multiple Access TXRU Transceiver (or Transceiver Unit)

UE User Equipment

UMTS Universal Mobile Telecommunications Systems

WCD Wireless Communication Device (interchangeable with UE)

Further, various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., nodes, cell sites, cell towers) to provide network coverage. The base stations are employed to broadcast and transmit transmissions to user devices of the telecommunications network. An base station may be considered to be a portion of a base station that may comprise an antenna, a radio, and/or a controller. In aspects, a base station is defined by its ability to communicate with a user equipment (UE), such as a wireless communication device (WCD), according to a single protocol (e.g., 3G, 4G, LTE, 5G, or 6G, and the like); however, in other aspects, a single base station may communicate with a UE according to multiple protocols. As used herein, a base station may comprise one base station or more than one base station. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 600 described herein with respect to FIG. 5.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station.

In aspects, a UE provides UE data including location and channel quality information to the wireless communication network via the base station. Location information may be based on a current or last known position utilizing GPS or other satellite location services, terrestrial triangulation, an base station's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the base station or at the individual antenna array of the base station. In other aspects, the processing of said information may be done remotely.

A service state of the UEs may include, for example, an in-service state when a UE is in-network (i.e., using services of a primary provider to which the UE is subscribed to, otherwise referred to as a home network carrier), or when the UE is roaming (i.e., using services of a secondary provider providing coverage to the particular geographic location of the UE that has agreements in place with the primary provider of the UE). The service state of the UE may also include, for example, an emergency only state when the UE is out-of-network and there are no agreements in place between the primary provider of the UE and the secondary provider providing coverage to the current geographic location of the UE. Finally, the service state of the UE may also include, for example, an out of service state when there are no service providers at the particular geographic location of the UE.

The UE data may be collected at predetermined time intervals measured in milliseconds, seconds, minutes, hours, or days. Alternatively, the UE data may be collected continuously. The UE data may be stored at a storage device of the UE, and may be retrievable by the UE's primary provider as needed and/or the UE data may be stored in a cloud based storage database and may be retrievable by the UE's primary provider as needed. When the UE data is stored in the cloud based storage database, the data may be stored in association with a data identifier mapping the UE data back to the UE, or alternatively, the UE data may be collected without an identifier for anonymity.

In accordance with a first aspect of the present disclosure a method for adaptably assigning a modulation and coding scheme (MCS). The method begins with receiving a first uplink message from at least one user equipment (UE), which contains a first channel condition report. A first level of interference for the at least one UE is also determined based on the first channel condition report. Based on the first level of interference and the first channel condition report an uplink radio condition is then determined for the at least one UE. After the uplink radio condition has been determined a first MCS is assigned to the at least one UE based on the uplink radio condition.

A second aspect of the present disclosure provides a system for adaptably assigning a modulation and coding scheme (MCS). The system includes a base station with one or more antennas for receiving uplink messages from at least one user equipment (UE) and for transmitting downlink messages to the at least one UE. The system also includes a processor that is configured to receive a first uplink message from the at least one UE device. The uplink message contains a first channel condition report which is used to determine a first level of interference for the at least one UE. The system then determines an uplink radio condition for the at least one UE based on the first channel condition report and the first level of interference. A first MCS is then assigned to the at least one UE based on the uplink radio condition.

Another aspect of the present disclosure is directed to a non-transitory computer storage media storing computer-useable instructions that, when used by one or more processors, cause the processors to transmit an uplink message to the base station. The uplink message contains a first channel condition report. The instructions also provide for receiving a downlink message from the base station that contains at least one resource block grant and a first MCS. The first MCS is based on the channel condition report and a first level of interference.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

Network environment 100 includes user equipment (UE) devices 102, 104, 106, 108, and 110, base station 114 (which may be a cell site or the like), and one or more communication channels 112. The communication channels 112 can communicate over frequency bands assigned to the carrier. In network environment 100, UE devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device (500) that communicates via wireless communications with the base station 114 in order to interact with a public or private network.

Figure 5:
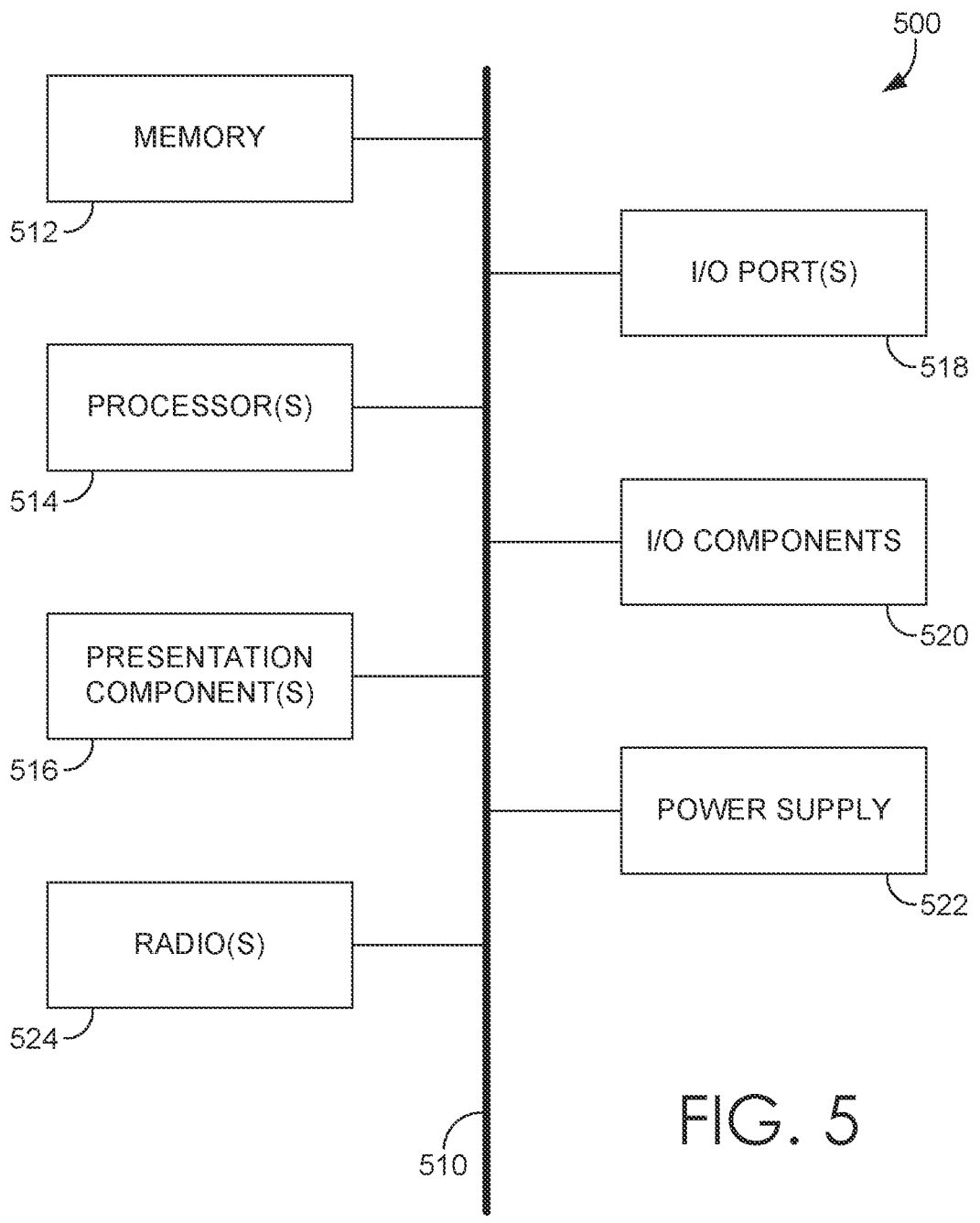
FIG. 5 depicts an exemplary computing device suitable for use in implementations of the present disclosure, in accordance with aspects herein.

In some aspects, each of the UEs 102, 104, 106, 108, and 110 may correspond to computing device 500 in FIG. 5.

Thus, a UE can include, for example, a display(s), a power source(s) (e.g., a battery), a data store(s), a speaker(s), memory, a buffer(s), a radio(s) and the like. In some implementations, for example, devices such the UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UEs 102, 104, 106, 108, and 110 in network environment 100 can optionally utilize one or more communication channels 112 to communicate with other computing devices (e.g., a mobile device(s), a server(s), a personal computer(s), etc.) through base station 114. Base station 114 may be a gNodeB in a 5G or 6G network.

The network environment 100 may be comprised of a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, and the like) to user devices, such as UEs 102, 104, 106, 108, and 110. For example, the one or more communication channels may provide voice, SMS, and/or data services to UEs 102. 104, 106, 108, and 110, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, UMTS), a 4G network (WiMAX, LTE, HSDPA), or a 5G network or a 6G network.

In some implementations, base station 114 is configured to communicate with a UE, such as UEs 102, 104, 106, 108, and 110, that are located within the geographic area, or cell, covered by radio antennas of base station 114. Base station 114 may include one or more base stations, base transmitter stations, radios, antennas, antenna arrays, power amplifiers, transmitters/receivers, digital signal processors, control electronics, GPS equipment, and the like. In particular, base station 114 may selectively communicate with the user devices using dynamic beamforming.

As shown, base station 114 is in communication with a network component 130 and at least a network database 120 via a backhaul channel 116. As the UEs 102, 104, 106, 108, and 110 collect individual status data, the status data can be automatically communicated by each of the UEs 102, 104, 106, 108, and 110 to the base station 114. Base station 114 may store the data communicated by the UEs 102, 104, 106, 108, and 110 at a network database 120. Alternatively, the base station 114 may automatically retrieve the status data from the UEs 102, 104, 106, 108, and 110, and similarly store the data in the network database 120. The data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the status data stored in the network database 120 current. For example, the data may be received at or retrieved by the base station 114 every 10 minutes and the data stored at the network database 120 may be kept current for 30 days, which means that status data that is older than 30 days would be replaced by newer status data at 10 minute intervals. As described above, the status data collected by the UEs 102, 104, 106, 108, and 110 can include, for example, service state status, the respective UE's current geographic location, a current time, a strength of the wireless signal, available networks, and the like.

5G and 6G networks are designed to provide ultra-reliable and low latency communications (URLLC). 5G defines a new radio (NR) interface with a new mechanism at the physical layer (PHY) and the medium access control (MAC) layer to provide reductions in latency. The scheduling scheme can significantly affect latency. 5G uses a configured grant to schedule uplink transmissions, thus eliminating the need to request and assign resources for each packet transmission. The configured grant pre-allocates the resources to the UE. In particular, the configured grant is an uplink configured grant.

In a 5G NR network radio resources can be allocated using configured grant scheduling for both uplink and downlink scheduling. With configured grant scheduling radio resources are pre-assigned on a periodic basis to the UEs. When a packet is generated it can be transmitted immediately using the pre-allocated resources. The use of configured grant scheduling eliminates the need for the UE to exchange multiple signaling messages with the base station. The periodicity of the pre-allocated downlink resources is configured by radio resource control (RRC) signaling when the connection is established. The allocated downlink resources can be signaled, activated, or deactivated using control messages.

For uplink messages, the configured uplink grant, including the periodicity, can be configured by RRC signaling when the connection is established. Alternatively, the periodicity of the uplink grant can be defined by RRC signaling at session establishment, while the configured uplink grant is either signaled, activated, or deactivated by control messages.

In addition to the allocation of resource blocks the base station also specifies the modulation and coding scheme (MCS) to be used in conjunction with the resource block allocation. The MCS defines the numbers of useful bits which can be carried by one symbol. 5G NR defines a symbol as a resource element (RE) and MCS as the number of useful bits that can be transmitted per RE. MCS depends on the radio signal quality of the wireless link, with better signal quality allowing use of a higher MCS and consequently, the more useful bits can be transmitted in a symbol. Conversely, bad signal quality can result in the use of a lower MCS, with greater redundancy bits, meaning less useful data can be transmitted within a symbol.

MCS can be considered to depend on a block error rate (BLER). A BLER threshold can be defined as a predetermined threshold, for example 10%. To maintain the BLER the base station can allocate MCS using a link adaptation algorithm. The MCS defines the modulation and the code rate. Modulation specifies how many bits can be carried by a single RE, regardless of whether it is a useful bit or a parity bit. To give one example, in quadra phase shift keyed (QPSK) two bits can be transmitted per RE, with 16 quadrature amplitude modulation (QAM), four bits be RE can be transmitted. These two and 16 values are known as the modulation order.

Code rate can be defined as the ratio between useful bits and total transmitted bits, which includes redundant bits. The redundant bits are added for forward error correction (FEC). Code rate is the ration between the number of information bits at the top of the physical layer and the number of bits mapped to the physical downlink shared channel (PDSCH) at the bottom of the physical layer. Thus, code rate is a measure of the redundancy added by the physical layer. Lower coding rates correspond with increased redundancy.

The network component 130 comprises a memory 132, a scheduler 134, and a MCS selection engine 136. All determinations, calculations, and data further generated by the scheduler 134 and the MCS selection engine 136 may be stored at the memory 132 and also at the data store 140. Although the network component 130 is shown as a single component comprising the memory 132, the scheduler 134, and the MCS selection engine 136, it is also contemplated that each of the memory 132, scheduler 134, and MCS selection engine 136 may reside at different locations, be its own separate entity, and the like, within the home network carrier system.

The network component 130 is configured to retrieve signal information, UE device information, latency information, including quality of service (QoS) information, and metrics from the base station 114 or one of the UE devices 102, 104, 106, 108, and 110. UE device information can include a device identifier and data usage information. The scheduler 134 and the MCS selection engine 136 can receive signal condition measurements and power levels from the UEs 102, 104, 106, 108, and 110. The scheduler 134 and the MCS selection engine 136 can be located in a central office or other centralized location for a virtualized radio access network. For a distributed radio access network, the scheduler 134 and the MCS selection engine 136 can be located at the base station 114. The base station 114 may be a gNodeB that interfaces with the MCS selection engine 136 and scheduler 134.

The UE, which may be any one of UEs 102, 104, 106, 108, and 110 sends an uplink message over the communication channel 112. The base station 104 receives from the UE channel state information and a signal condition report, which may be a signal-to-noise and interference (SINR) measurement. Other signal condition measurements may be used in place of SINR. The information provided by the UE allows the base station 104 to learn the average uplink radio conditions that the UE encountered. The base station 104 then allocates the grants using the MCS selection engine 136. The MCS selection engine uses the channel state information and signal condition information, along with knowledge of what other UEs are in communication with the base station 104 and what resources those other UEs are using, to select a particular MCS for the UE to use in upcoming messages. The MCS selection engine 136 works in conjunction with scheduler 134 to determine the uplink configured grant for the UE.

Figure 2:
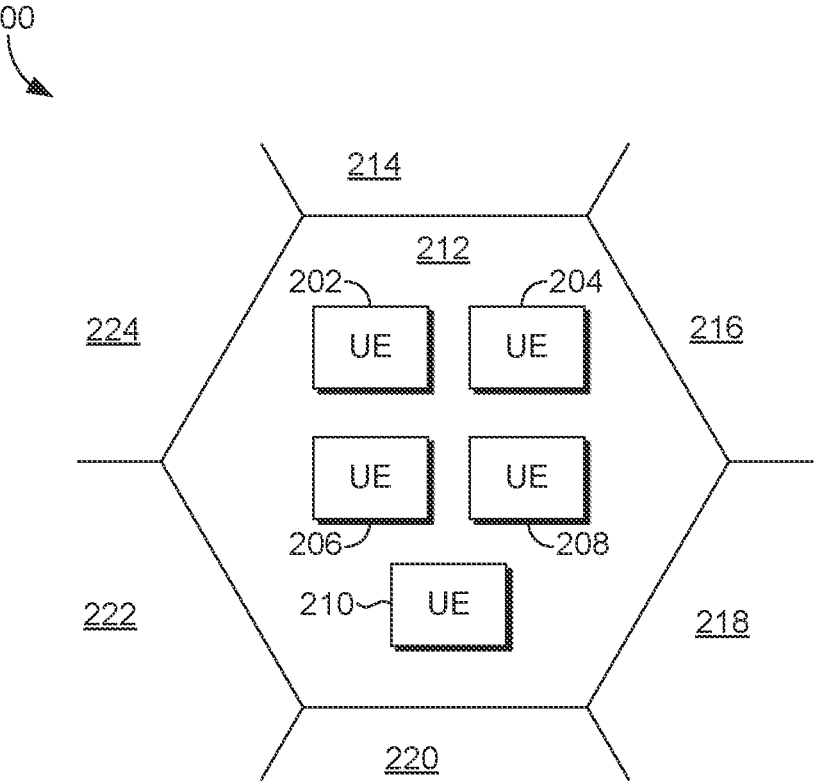
FIG. 2 depicts a cellular network suitable for use in implementations of the present disclosure, in accordance with aspects herein.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cells 212, 214, 216, 218, 220, 222, 224, each including base station or base station 114, backhaul channel 116, antenna for sending and receiving signals over communication channels 112, network database 120 and network component 130. The size of the geographic area 200 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. For example, as shown in FIG. 2, UEs 202, 204, 206, 208, and 210, may be located within geographic area 200 collecting UE data that is useable by network component 130, in accordance with aspects herein. UEs 202, 204, 206, 208, and 210 can move within the cell currently occupying, such as cell 212 and can move to other cells such as adjoining cells 214, 216, 218, 220, 222 and 224.

FIG. 3 depicts a modulation and coding scheme (MCS) table, in which implementations of the present disclosure may be employed, in accordance with aspects herein. The MCS table 300 is a lookup table that is used by the MCS selection engine 136 when an uplink configuration grant is to be allocated to a UE. The MCS table 300 is sued to find which data rate will be negotiated between the UE and the base station 104, once the connection parameters are known. For each possible combination of modulation, coding rate, number of spatial streams, channel width, and guard interval, there is a unique MCS index. For a MCS zero scheme, the number of redundancy bits is higher, the modulation is bi-phase shift keyed (BPSK) and the symbols are further apart. The MCS zero has more redundant bits, making it less efficient. This provides greater protection from errors as well as a more robust connection. MCS table 300 in FIG. 3 is a partial listing of the possible MCS selections, non-zero MCS table entries may include higher data rates, for example, up to 28.

Higher data rate modulation has smaller distances between symbols, which results in less error protection, and a more fragile connection. This is evident when comparing the MCS 7 coding stream which has a 64-QAM modulation and a 5/6 coding rate. Coding refers to the number of bits required to send "x" number of bits. For example, 5/6 coding means that 6 bits are used for every 5 bits sent, which is more efficient than 1/2 coding rate, with two bits needed to send 1 bit.

While signal strength is an often used measure of connection quality, a drawback is that signal strength is not measured consistently. The MCS is a better reflection of the real network performance because it attempts to use the highest possible data rate that the channel conditions can support. Using a low MCS can indicate that the UE is facing significant challenges with the radio frequency (RF) environment. The connection is not optimal and there may be significant interference affecting the UE. In contrast, good uplink RF conditions allow the use of higher MCS.

FIG. 4 is a flow diagram of a method for adjusting a modulation and coding scheme allocation in an uplink configured grant, in which aspects of the present disclosure may be employed, in accordance with aspects herein. The method 400, begins with receiving a first uplink message from at least one user equipment (UE) device in step 402. The first uplink message from the UE may be an initial connection message or may be part of ongoing communications between the at least one UE and the base station. The first uplink message contains a first channel condition report. The first channel condition report allows the base station to consider the channel conditions at the UE, which can be different from the channel conditions at the base station.

The method then continues in step 404 with determining a level of interference for the at least one UE based on the first channel condition report. The level of interference may be expressed in terms of a signal-to-noise and interference (SINR) value. After the first level of interference for the UE has been provided, the method continues in step 406 with determining an uplink radio condition for the at least one UE based on the first channel condition report and the first level of interference. The method concludes in block 408 with assigning a first MCS to the at least one UE based on the uplink radio condition. The base station can also assign to the UE at least one resource block and may communicate the grants to the UE in a downlink message.

The UE may experience as change in channel condition that can make the assigned first MCS less optimal for communication. This can occur when the UE is moving or enters an area with more interference than previously.

FIG. 5 depicts an exemplary computing device suitable for use in implementations of the present disclosure, in accordance with aspects herein. With continued reference to FIG. 5, computing device 500 includes bus 502 that directly or indirectly couples the following devices: memory 504, one or more processors 506, one or more presentation components 508, input/output (I/O) ports 512, I/O components 510, radio 516, transmitter 518, and power supply 514. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 510. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 510. One or more presentation components 508 present data indications to a person or other device. Exemplary one or more presentation components 508 include a display device, speaker, printing component, vibrating component, etc. I/O ports 512 allow computing device 500 to be logically coupled to other devices including I/O components 510, some of which may be built into computing device 500. Illustrative I/O components 510 include a microphone, joystick, game pad, satellite dish, scanner, printer, wireless device, etc.

The radio 516 represents one or more radios that facilitate communication with a wireless telecommunications network. While a single radio 516 is shown in FIG. 5, it is contemplated that there may be more than one radio 516 coupled to the bus 502. In aspects, the radio 516 utilizes a transmitter 518 to communicate with the wireless telecommunications network. It is expressly conceived that a computing device with more than one radio 516 could facilitate communication with the wireless telecommunications network via both the first transmitter 518 and an additional transmitters (e.g. a second transmitter). Illustrative wireless telecommunications technologies include CDMA, GPRS, TDMA, GSM, and the like. The radio 516 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even base stations (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for adaptably assigning a modulation and coding scheme (MCS), comprising:

receiving a first uplink message from at least one user equipment (UE), the first uplink message comprising a first channel condition report comprising one or more uplink measurements from the at least one UE, wherein the one or more uplink measurements are generated by the UE based on the UE's own uplink transmission to a base station;

based on the first channel condition report, determining a first level of interference for the at least one UE;

determining an uplink radio condition for the at least one UE based on the first channel condition report comprising the one or more uplink measurements and the first level of interference; and assigning a first MCS to the at least one UE based on the uplink radio condition, wherein the first MCS is assigned as part of an uplink configured grant that pre-allocates resources to the at least one UE.

2. The method of claim 1, further comprising assigning at least one resource block to the at least one UE.

3. The method of claim 2, further comprising transmitting the first MCS and the at least one resource block to the at least one UE in a downlink message.

4. The method of claim 1, wherein the first level of interference is a signal-to-noise and interference (SINR) value.

5. The method of claim 1, further comprising receiving a second uplink message from the at least one UE.

6. The method of claim 5, wherein the second uplink message includes a second channel condition report from the at least one UE.

7. The method of claim 6, wherein the second channel condition report reflects different channel conditions than the first channel condition report.

8. The method of claim 6, further comprising determining a second level of interference for the at least one UE.

9. The method of claim 8, wherein the second level of interference is different than the first level of interference for the at least one UE.

10. The method of claim 8, further comprising assigning a second MCS to the at least one UE based on the second channel condition report and the second level of interference.

11. The method of claim 10, wherein the second MCS is different from the first MCS.

12. A system for adaptably assigning a modulation and coding scheme (MCS), comprising:

a base station having one or more antennas for receiving uplink messages from at least one user equipment (UE) and for transmitting downlink messages to the at least one UE, and a processor, the processor configured to:

receive a first uplink message from the at least one UE, the first uplink message comprising a first channel condition report comprising one or more uplink measurements from the at least one UE, wherein the one or more uplink measurements are generated by the UE based on the UE's own uplink transmission to the base station;

based on the first channel condition report, determine a first level of interference for the at least one UE;

determine an uplink radio condition for the at least one UE based on the first channel condition report comprising the one or more uplink measurements and the first level of interference; and assign a first MCS to the at least one UE based on the uplink radio condition, wherein the first MCS is assigned as part of an uplink configured grant that pre-allocates resources to the at least one UE.

13. The system of claim 12, further comprising assigning at least one resource block to the at least one UE.

14. The system of claim 13, further comprising transmitting the first MCS and the at least one resource block to the UE in a downlink message.

15. The system of claim 12, wherein the level of interference is a signal-to-noise and interference (SINR) value.

16. The system of claim 12, further comprising receiving a second uplink message from the at least one UE, wherein the second uplink message includes a second channel condition report used in determining a second level of interference for the at least one UE.

17. The system of claim 16, further comprising assigning a second MCS to the at least one UE based on the second level of interference.

18. A non-transitory computer storage media storing computer-useable instructions that, when used by one or more processors, cause the processors to:

transmit a first uplink message to a base station, the first uplink message containing a first channel condition report that includes one or more uplink measurements performed by a user equipment (UE), wherein the one or more uplink measurements are generated by the UE based on the UE's own uplink transmission; and receive a first downlink message from the base station, the first downlink message comprising at least one resource block grant and a first modulation and coding scheme (MCS) as part of an uplink configured grant that pre-allocates resources to the UE, the first MCS based on the first channel condition report including the one or more uplink measurements performed by the UE and a first level of interference.

19. The non-transitory computer storage media of claim 18, further comprising receive a second downlink message from the base station, the second downlink message containing a second MCS, based on a second channel condition and a second level of interference.

20. The non-transitory computer storage media of claim 19, wherein the first level of interference and the second level of interference are based on a signal-to-noise and interference (SINR) measurement.

* * * * *